US008833743B2

(12) United States Patent
Ko et al.

(10) Patent No.: US 8,833,743 B2
(45) Date of Patent: Sep. 16, 2014

(54) MULTI-DISC AIR DIFFUSER

(75) Inventors: Myung-Han Ko, Daejeon (KR);
Byong-Cheol Kwon, Daejeon (KR);
Sung-Ha Park, Daejeon (KR);
Kyung-Han Ko, Daejeon (KR);
Sang-Woo Kim, Daejeon (KR);
Seung-Jin Lee, Jeollabuk-do (KR);
Jae-Kyung Yang, Chungcheongnam-do
(KR); Kyoung-Ryeol Baek,
Chungcheongnam-do (KR); **Dae-Hwan
Yoon, Daejeon (KR); Kil-Hoo Park**,
Gangwon-do (KR)

(73) Assignee: ANT21 Co., Ltd, Daejeon (KR)

( * ) Notice: Subject to any disclaimer, the term of this patent is extended or adjusted under 35 U.S.C. 154(b) by 448 days.

(21) Appl. No.: 13/140,258

(22) PCT Filed: Dec. 17, 2009

(86) PCT No.: PCT/KR2009/007580
§ 371 (c)(1),
(2), (4) Date: Sep. 6, 2011

(87) PCT Pub. No.: WO2010/071376
PCT Pub. Date: Jun. 24, 2010

(65) Prior Publication Data
US 2011/0304063 A1    Dec. 15, 2011

(30) Foreign Application Priority Data

Dec. 17, 2008  (KR) .................. 10-2008-0128447
Dec. 16, 2009  (KR) .................. 10-2009-0125376

(51) Int. Cl.
*B01F 3/04*   (2006.01)
*C02F 3/20*   (2006.01)

(52) U.S. Cl.
CPC ....... *C02F 3/201* (2013.01); *B01F 2003/04276* (2013.01); *B01F 2003/04333* (2013.01); *B01F 2003/04375* (2013.01); *B01F 3/04262* (2013.01)
USPC ............... 261/121.1; 261/122.1; 261/124; 261/126

(58) Field of Classification Search
USPC ............... 261/77, 121.1, 122.1, 124, 126
See application file for complete search history.

(56) References Cited

U.S. PATENT DOCUMENTS 2,074,597 A * 3/1937 Stark .................... 261/121.2
2,603,465 A * 7/1952 Malzacher ................. 261/142

\* cited by examiner

*Primary Examiner* — Robert A Hopkins
(74) *Attorney, Agent, or Firm* — Ladas & Parry LLP (57) ABSTRACT

A multi-disc air diffuser according to the present invention comprises a bolt having a vent groove formed in a longitudinal direction thereof; a plurality of discs, each of the discs having a bolt joint section to be passed through the bolt, an air room for holding the air supplied through the vent groove, and a nozzle section having a plurality of nozzles which are arranged in an end part of the air room at a regular size and intervals, wherein the lower surface of each of the discs is more than the upper surface thereof and the outer circumference surface of each of the discs is formed to be inclined; and a backflow prevention section for joining to an end part of the bolt to adhere closely the discs to one another, connecting the vent groove to an air supply pipe, and having a check valve to prevent the air flowing backward from the vent groove to the air supply pipe.

10 Claims, 7 Drawing Sheets

MULTI-DISC AIR DIFFUSER

BACKGROUND OF THE INVENTION (1) Field of the Invention

The present invention relates to an air diffuser which provides air or gas to a wastewater treatment plant, a combined septic tank, an aerobic reactor such as an aerobic fermentation tank, or a fish-breeding tank, which require adequate dissolved oxygen. More particularly, the present invention relates to a multi-disc air diffuser which can supply uniform and minute air bubbles in a great quantity over a large area of an aeration tank so that the concentration of dissolved oxygen is increased, thereby making it possible to treat wastewater efficiently.

(2) Description of the Related Arts

Today, as the industrialization and the urbanization continues to increase, the environmental pollution is getting worse and the various types of wastewater, dirty water and sewage are discharged. Thus, facilities for treating them have also highly developed and costs for treating have increased.

Now in order to treat the wastewater, a biological treatment method optionally combined with a physical and chemical treatment method is usually used. The biological treatment method can be divided into an anaerobic treatment method and an aerobic treatment method.

The advantages of the anaerobic treatment method are that it does not need an oxygen supply and can obtain flammable methane gas. However, the method has disadvantages of having a long reaction time and a smell.

The aerobic treatment method has a disadvantage of needing energy for supplying oxygen. However, because its reaction time is short and organic materials can be removed completely, the aerobic treatment method makes up the majority of wastewater treatment processes.

In the aerobic treatment method, an oxygen supply is essential for the growth and activity of aerobic microorganism, and an air diffuser is used to supply oxygen.

The air diffuser is installed in the inside of an aeration tank (a reaction tank). It is important that the concentration of dissolved oxygen DO is kept adequately in the aeration tank. In the aeration tank, because gas is dispersed in wastewater of liquid state, the size and the staying amount of air bubbles, and a contacting and flowing property of gas and liquid states affect significantly in an operation condition, capability and efficiency of the aeration tank.

In order to increase contact surface and a coefficient of mass transfer between gas and liquid in the aeration tank, it is efficient to increase the staying amount of air bubbles. To achieve this, it is necessary to reduce the size of the air bubble and to generate uniformly.

This is because the air bubbles are increased and raised by combing to each other in the aeration tank, and the raising speed of the air bubbles is increased in proportion to the size of the air bubbles.

If the air bubbles have a large and non-uniform size, the staying time of the air bubbles in the aeration tank is shorter and the standard oxygen transfer efficiency SOTE is dropped.

Therefore, an air diffuser having high SOTE is required. That is, if an air diffuser can generate uniform air bubbles with decreasing their size, it is possible to reduce the number of the air diffuser installed in the aeration tank, thereby reducing the installation charge of treatment facilities.

As described above, as the industrialization and the urbanization continues to increase, various types of wastewater, dirty water and sewage are discharged, and facilities for treating them have also highly developed and costs for treating have increased.

Now in wastewater treatment processes, in order to keep the dissolved oxygen DO in the aeration tank at an adequate concentration, an electric energy cost is highly required. If an air diffuser having high SOTE is developed to generate uniform air bubbles with decreasing their size, the number and the time of running an air blower can be reduced than a conventional air diffuser, thereby decreasing considerably the electric energy cost.

If the electric energy cost is reduced, it can contribute to reduce carbon dioxide gas that causes the greenhouse effect.

The capability of an air diffuser can be degraded by a great deal of organic or inorganic matter included in wastewater. That is, by depositing sludge in the outside of the air diffuser, the generation of the air bubbles may be disturbed. Further, because the wastewater can be flowed backward into the air diffuser by the water pressure of the aeration tank, it becomes possible to shorten the lifetime of apparatus such as an air blower.

If an air diffuser for solving these problems is provided, it is possible to reduce replacement and maintenance costs.

From this point of view, conventional air diffusers used today will be looked at here. Conventional air diffusers are divided into a pipe type, a ball type and a disc type.

The disc type of air diffuser has some problems that air holes may be clogged by depositing of sludge and the capacity of an air blower should be large enough to keep the dissolved oxygen at a constant concentration, which is caused by a pressure load. Further, the air holes can be enlarged by using repeatedly and the air bubbles are expanded, so that the staying time of the air bubbles is shorten and the SOTE is dropped.

Further, in an upper disc and a lower disc being adjacent to each other, the lower surface of the upper disc may be adhered to cover completely the upper surface of the lower disc. In this case, there is a problem that the air bubbles held in an air room cannot be generated uniformly and minutely by the lower surface of the upper disc.

As a result, there is a problem that the size of the air bubbles may be non-uniform or enlarged by growing the air bubbles in the lower surface of the upper disc.

Further, there is a problem that the air bubbles are not supplied steadily by a pressure load due to introduce and deposit sludge in the air nozzle. In this case, in order to remove the sludge, the multi-disc air diffuser should be disassembled. Accordingly, the maintenance of the air diffuser becomes difficult.

SUMMARY OF THE INVENTION

An object of the present invention is to provide, for solving the problems, a multi-disc air diffuser in which a part of an air nozzle formed the upper surface of a disc is exposed to outside so that uniform and minute air bubbles are generated and diffused over a large area, thereby increasing an contact surface between gas and liquid in an aeration tank and the efficiency of mass transfer between gas and liquid.

Another object of the present invention is to provide a multi-disc air diffuser in which, when the air pressure is raised by introducing and depositing sludge, a disc is deformed elastically to prevent effectively an air nozzle from clogging.

Still another object of the present invention is to provide a multi-disc air diffuser in which the possibility of troubles can be reduced by minimizing a pressure load.

In order to accomplish the object, the present invention is constituted as shown below.

According to a first aspect of the present invention, there is provided a multi-disc air diffuser comprising: a bolt having a vent groove formed in a longitudinal direction thereof; a plurality of discs, each of the discs having a bolt joint section to be passed through the bolt, an air room for holding the air supplied through the vent groove, and a nozzle section having a plurality of nozzles which are arranged in an end part of the air room at a regular size and intervals, wherein the lower surface of each of the discs is more than the upper surface thereof and the outer circumference surface of each of the discs is formed to be inclined; and a backflow prevention section for joining to an end part of the bolt to adhere closely the discs to one another, connecting the vent groove to an air supply pipe, and having a check valve to prevent the air flowing backward from the vent groove to the air supply pipe; wherein each two discs being adjacent to each other are arranged that a lower surface of an upper disc is adhered closely to an upper surface of a lower disc and the air nozzle formed on the upper surface of the lower disc is exposed outside of the outer circumference of the upper disc.

As described above, according to the present invention, by exposing a part of the air nozzle formed the upper surface of each of the discs, uniform and minute air bubbles are supplied over a large area in a great quantity. Thus, it is possible to increase the contact area between gas and liquid in the aeration tank and the efficiency of mass transfer between gas and liquid.

Further, in case that the air pressure is raised by introducing and depositing sludge, the discs can be deformed elastically. Thus, it is possible to prevent effectively the air nozzle from clogging.

Further, because it becomes possible to generate uniform air bubbles without increasing their size, the number and the time of running the air blower can be reduced, thereby decreasing considerably the cost of electric energy.

Explanation of symbols:

| 20 | aeration tank | 30 | air bubbles |
|---|---|---|---|
| 40 | air blower | 50 | wastewater |
| 100 | air diffuser | 101 | bolt joint section |
| 103 | air room | 105 | air nozzle |

-continued

Explanation of symbols:

| 110 | a first disc | 111 | cover |
|---|---|---|---|
| 120 | a second disc | 110~150 | discs |
| 1510 | nozzle section | | |
| 152 | outer inclined section | | |
| 1520 | inner circumference step jaw | | |
| 153 | body section | 155 | supporting protrusion |
| 156 | air gap | 157 | contact surface |
| 159a, 159b | air transfer holes | | |
| 158 | inner inclined section | | |
| 160 | bolt | 161 | vent groove |
| 170 | backflow prevention section | | |
| 200 | air supply pipe | 310 | check valve |

DETAILED DESCRIPTION OF THE EMBODIMENTS

A multi-disc diffuser according to embodiments of the present invention will be herein described with reference to the drawings. The following embodiments are provided for the purpose of illustrating the present invention, but not for the purpose of restricting the scope of the present invention. As will become apparent, changes and modifications may be made in the function and arrangement of the elements described in these embodiments without departing from the spirit and scope of the invention.

As shown FIGS. 1 to 8, a multi-disc diffuser 100 according to an embodiment of the present invention comprises a plurality of discs 110~150 which becomes smaller as it goes to upper layer, a bolt 160 for joining the discs 110~150; and a backflow prevention unit 170. A cover 111 is coupled on a top disc 110.

Figure 3:
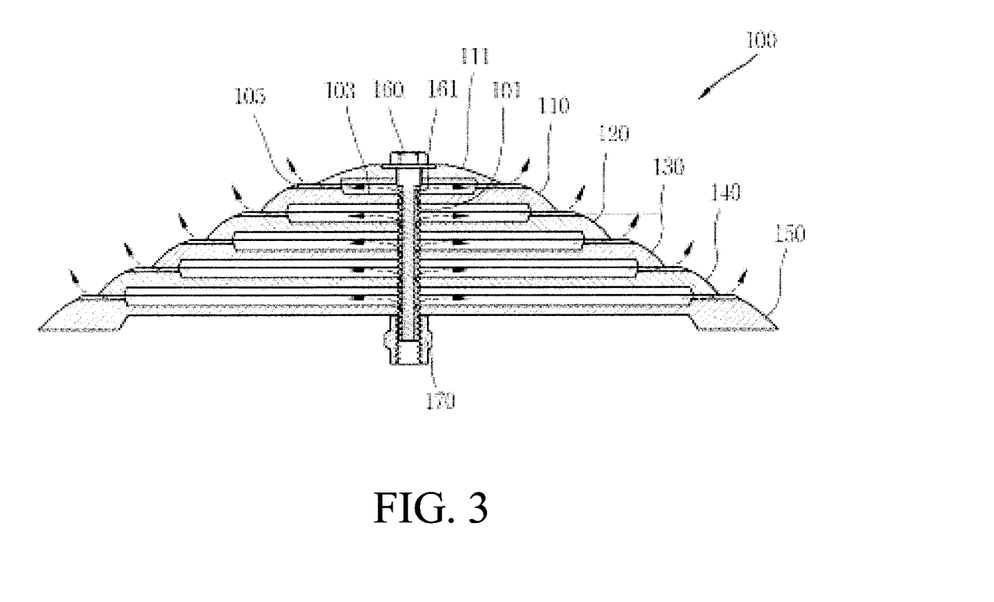
FIG. 3 is a side cross sectional view showing a multi-disc air diffuser according to an embodiment of the present invention.

In more detail, each of the discs 110~150 has an upper surface, a lower surface more than the upper surface, and the outer side surface inclined.

A bolt joint section 101 is formed in the center of each of the discs 110~150 and an air room 103 is formed around the bolt joint section 101.

A plurality of air nozzles 105 are formed at a regular intervals in the circumference direction of each of the disc 110~150. Each of the air nozzles 105 is adjacent to each of the air rooms 103, is a slit shaped and has an equal size.

Tests have shown that if the size of each of the air nozzles 105 is less than 0.1 mm, then the air nozzles are clogged frequently, and if the size is more than 0.8 mm, then it is difficult to generate minute air bubbles. Therefore, it is preferable that the opening width of each of the air nozzles (which is measured along the circumference direction of the discs 110~150) is 0.1 to 0.8 mm.

The bolt 160 has a vent groove 161 in its outer surface. The end part of the bolt 160 is screwed onto the top of the backflow prevention unit 170. Thus, the cover 111 and the discs 110~150 are assembled and coupled by the screwing force between the bolt 160 and backflow prevention unit 170. Further, an air supply pipe 200 or an air blower 40 is directly connected to the lower side of the backflow prevention unit 170.

Further, a check valve 310 is arranged in the inside of the backflow prevention unit 170. The check valve 310 comprises a ball, sealing and so on, and allows air to flow from the air blower 40 to the air diffuser 100 and prevents flowing backward from the air diffuser 100 to the air blower 40.

Each two discs 110, 120 being adjacent to each other in the plurality of discs 110~150 are arranged that a lower surface of an upper disc 110 is adhered closely to an upper surface of a lower disc 120. Further, it is desirable that a part of the air nozzle 105 formed on the upper surface of the lower disc 120 is exposed from the lower surface of the upper disc 110.

That is, for example, the lower surface of the first disc 110 arranged in upper layer is adhered closely to the upper surface of the second disc 120 arranged in lower layer, and a part of the air nozzle 105 is opened. Thus, by exposing a part of the air nozzle 105, the air bubbles gathered in the air room 103 are generated minutely, uniformly and plentifully, through the air nozzle 105 without being affected by the lower surface of the first disc 110.

The above structure can be applied to every disc equally.

The operation of the thus-structured multi-disc air diffuser according to an embodiment of the present invention will be described hereinafter.

Figure 1:
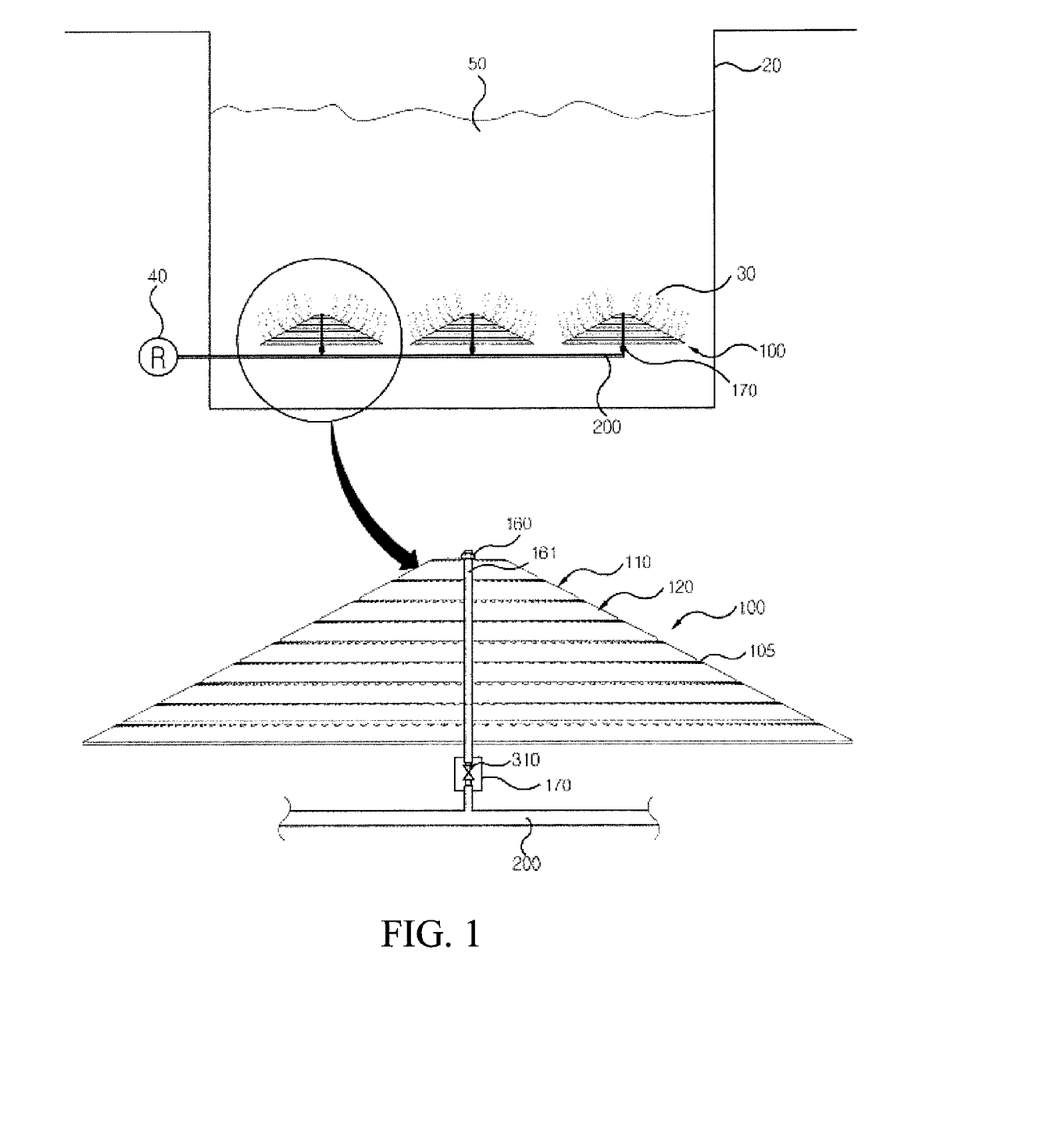
FIG. 1 is a side view showing the operation of an aeration tank and a multi-disc air diffuser according to an embodiment of the present invention
Figure 2:
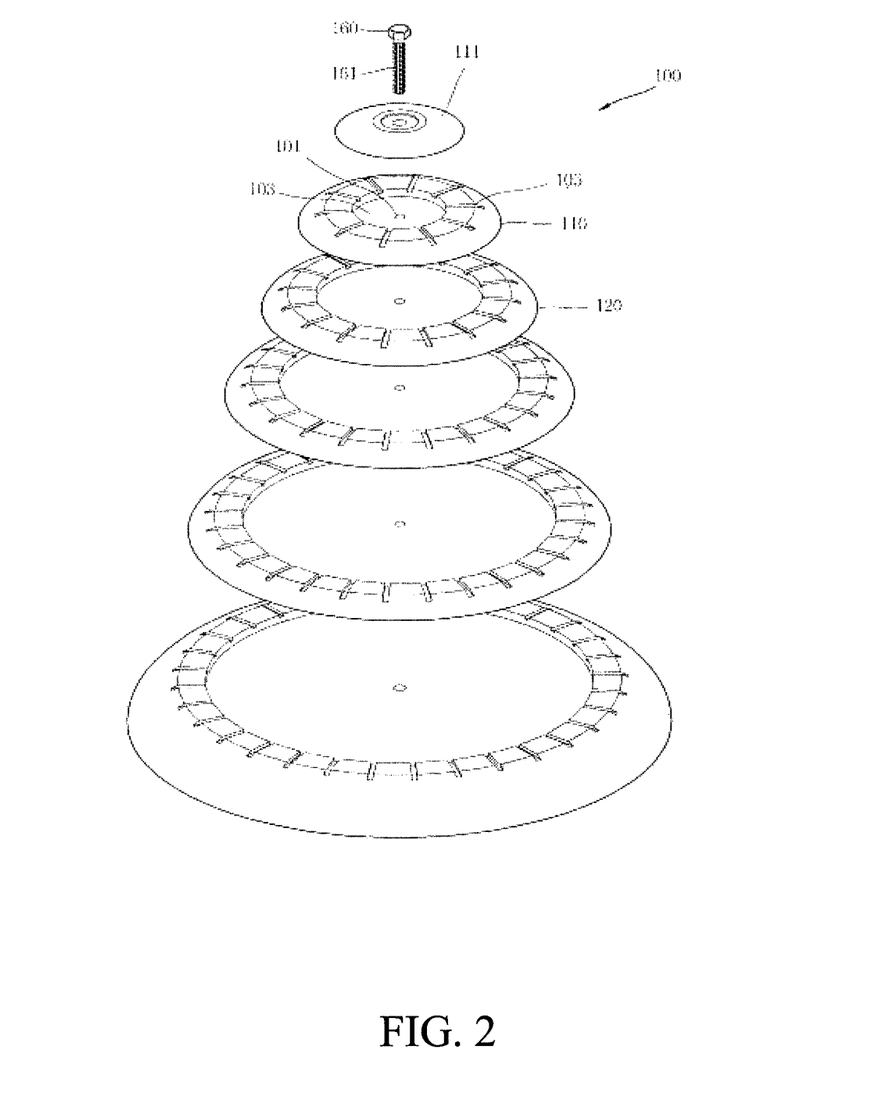
FIG. 2 is an illustrated perspective view of the multi-disc air diffuser in FIG. 1.

Air is injected into the air diffuser 100 through the blower 40 and the air supply pipe 200, and supplied to an upward direction through the vent groove 161 of the bolt 160. The air is injected into the air room 103 of each of the discs 110~150 along the vent groove 161 of the bolt 160. If the pressure of the air is more than a predetermined level, then the air is supplied to an aeration tank 20 through the air nozzle 105. Therefore, until the pressure reaches to a predetermined level, the air supplied to the air diffuser 100 continues to rise along to the vent groove 161 of the bolt 160. The waste water 50 held in the aeration tank 20 is provided with the air bubble 30, and is purified by microbes.

In case of the present invention, a part of the air nozzle 105 arranged in the upper surface of the second disc 120 is exposed to outside of the first disc 110, so that the air bubbles are generated uniformly and minutely, and dispersed to the aeration tank 20 without combining with one another. Therefore, it is possible to increase a contact area between gas and liquid in the aeration tank 20 and the efficiency of mass transfer between gas and liquid continuously.

Figure 4:
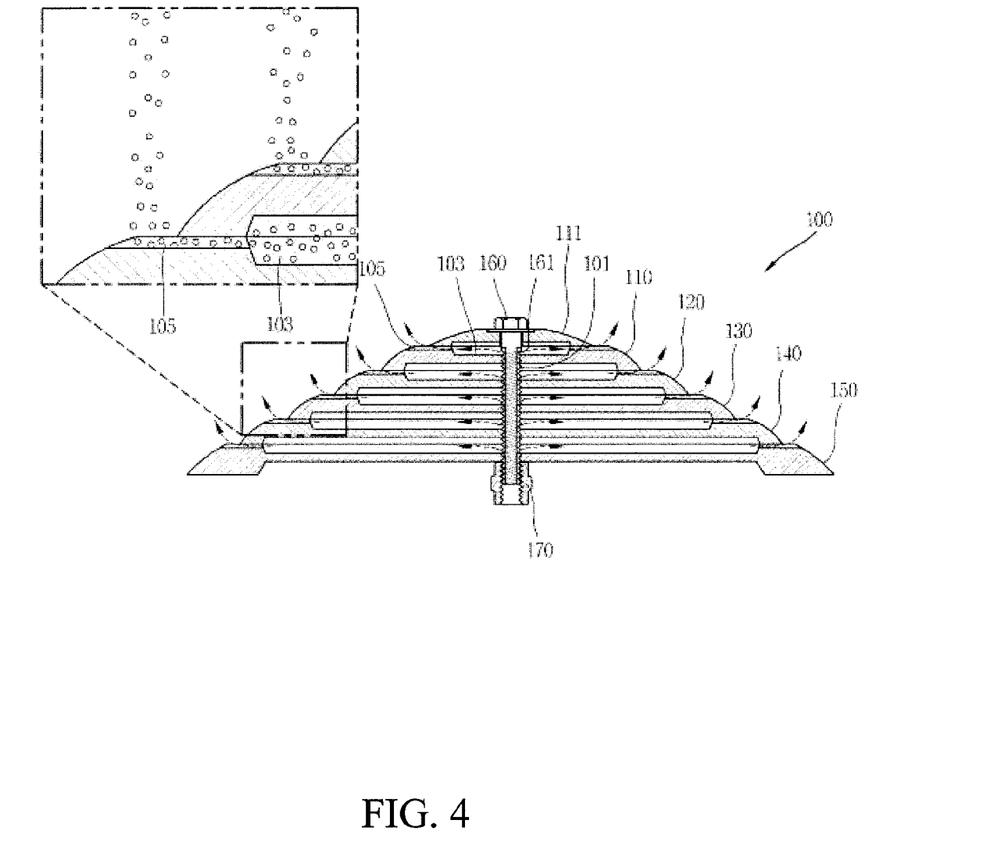
FIG. 4 is a cross sectional view showing the operation of a multi-disc air diffuser according to an embodiment of the present invention.

As shown FIG. 4, in the multi-disc diffuser 100 according to an embodiment of the present invention, a part of the air nozzle 105 arranged in the upper surface of the second disc 120 is exposed to outside, so that the air bubbles gathered in the air room 103 is not affected by the lower surface of the first disc 110. That is, the air bubbles are not obstructed by the lower surface of the first disc 110 arranged upper layer. Therefore, the combination of the air bubbles is minimized and uniform and minute air bubbles is supplied to over a large area in a great quantity, which make it possible to increase the contact area between gas and liquid in the aeration tank 20 and the efficiency of mass transfer between gas and liquid.

Figure 5:
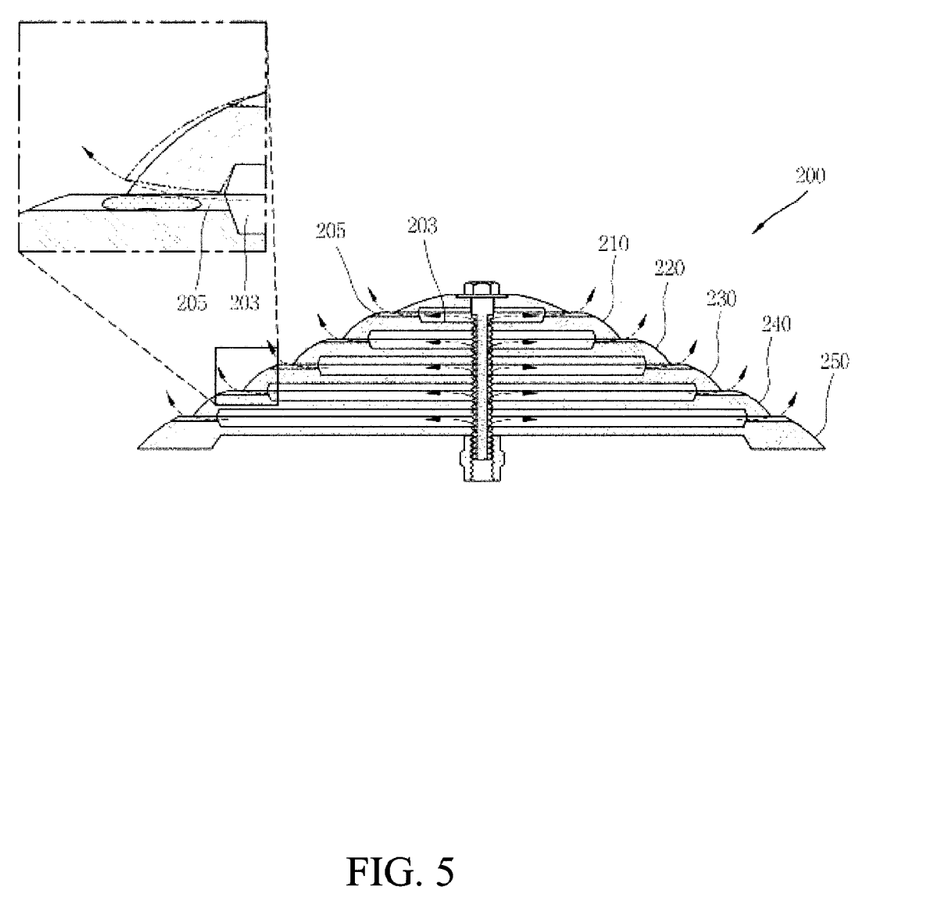
FIG. 5 is a schematic view for explaining to prevent an air nozzle of a disc from clogging in a multi-disc diffuser according to an embodiment of the present invention.

FIG. 5 is a schematic view for explaining to prevent the air nozzle of the disc from clogging in the multi-disc diffuser according to an embodiment of the present invention.

As shown FIG. 5, in the multi-disc diffuser 200 according to an embodiment of the present invention, at least one of the plurality of discs 210~250 is made of a flexible material, such as rubber or elastic plastic.

In the case that at least one of the plurality of discs 210~250 is made of a flexible material, when the pressure of the air gathered in the air room 203 is raised by introducing or depositing sludge, as shown by a dashed line, the disc is elastically deformed upward by the pressure so that the vicinity of the air nozzle 205 is opened, which makes it possible to prevent effectively the air nozzle 205 from clogging.

Next, the multi-disc air diffuser 100 according to an embodiment of the present invention will be herein described in more details with reference to the FIGS. 1, 2, 6 and 7.

Figure 6:
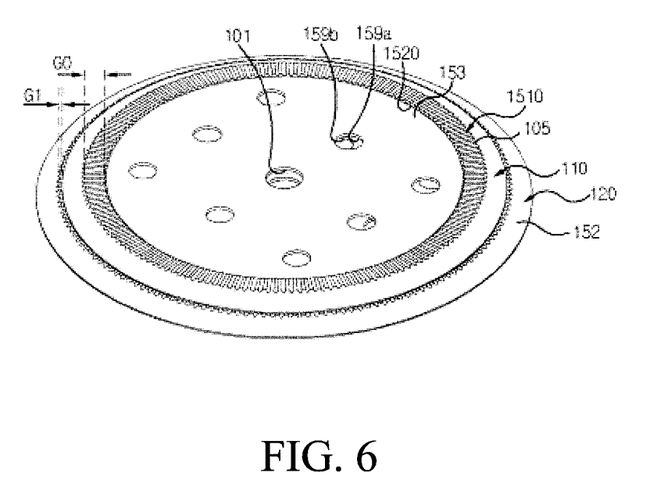
FIG. 6 is a perspective view showing an example for stacking a first and a second discs according to an embodiment of the present invention.
Figure 7:
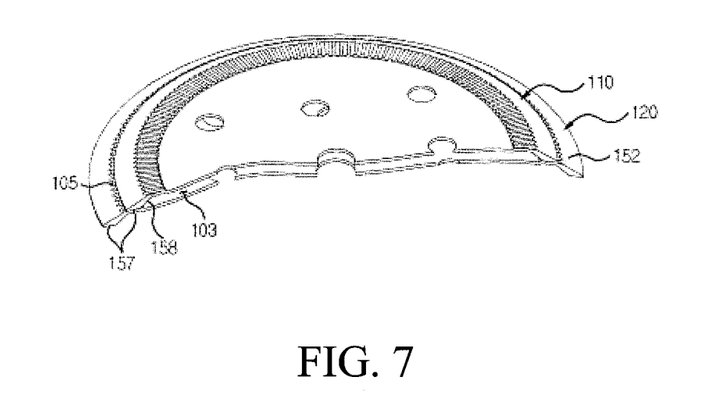
FIG. 7 is a cut-away perspective view of FIG. 6.

The multi-disc air diffuser 100 of the present invention includes the first disc 110 and the second disc 120 which are adhered closely to each other in a vertical direction. However, the multi-disc air diffuser 100 is not limited to the example in which two discs are arranged. Rather, the multi-disc air diffuser 100 according to the present invention may include three or more discs.

Each of the first disc 110 and the second disc 120 comprises a body section 153, a nozzle section 1510, an outer inclined section 152, a contact surface 157 and a bolt joint section 101. The first disc 110 and the second disc 120 are closely adhered to each other in a vertical direction that the air is raised, so that an air room 103 is formed between each of the body sections 153.

The air supplied by the air blower 40 is transferred to the air supply pipe 200 and supplied to the air room 103 via the backflow prevention unit 170 and the vent groove 161 of the bolt 160. The air held in the air room 103 is sprayed to the outside of the multi-disc air diffuser 100 through the air nozzle 105.

The first disc 110 is arranged on the upper side of the second disc 120, and the air nozzle 105 of the second disc 120 is covered with the contact surface 157 of the first disc 110. Then, a part of the air nozzle 105 of the second disc 120 arranged in lower layer is exposed to the outside of the outer circumference of the first disc 110. Therefore, it becomes possible to prevent the air bubbles 30 sprayed from the air nozzle 105 from growing and to separate minutely the air bubbles 30 from the end part of the air nozzle 105.

The width G1 of the exposed part of the air nozzle 105 is less than the width G0 of the nozzle section 1510, and the ratio of each width G0 and G1 is determined according to various design variable such as the diameter of the disc, the supply pressure of the air, the type of waste water, the installation depth of the air diffuser installed in the aeration tank and the size of the air diffuser.

In case that the end part of the air nozzle 105 of the second disc 120 is coincided with the end part of the contact surface 157 of the first disc 110, the air is not immediately detached from the end part of the air nozzle 105. That is, the air may be stayed in the end part of the air nozzle 105 for some time, and at this time the air bubbles 30 can be grown.

In order to prevent this, in the present invention, the air bubbles 30 are not detached from only the end part of the air nozzle 105 but detached freely from the part that the air nozzle 105 is exposed to outside. Therefore, it becomes possible to prevent the air bubbles 30 from growing and to generate uniform and minute air bubbles.

The body section 163 has a circular plate shape and functions as a partition of the air room 103.

The nozzle section 1510 comprises a plurality of air nozzles 105 arranged along the outer circumference of the upper surface of the body section 153. The air nozzle 105 is opened in the radial direction of the body section 153 so that the air is sprayed to the aeration tank 20.

The outer inclined section 152 is extended to be inclined to the outside of the nozzle section 1510. The outward aspect of the multi-disc air diffuser 100 has a cone shape due to the shape of the outer inclined section 152. By forming the inclined part, the air bubbles 30 sprayed from the air nozzle 105 of the lower side of the outer inclined section 152 can be raised without interfering with other equipment arranged in the upper side thereof. That is, because the rising of the air bubbles are not obstructed, it becomes possible to prevent the air bubbles 30 from growing.

The contact surface 157 covers the nozzle section 1510 to prevent the air from leaking out, and corresponds to the lower surface of the outer inclined section 152. An inner inclined section 158 is arranged in the inside of the contact surface 157, which narrows gradually the cross sectional area of the air path from the air room 103 to the nozzle section 1510. Thus, it becomes possible to prevent the air pressure from changing suddenly, to suppress an eddy from generating, and to form a continuous air flow.

In order to increase further above described action, a step jaw is formed in the inside of the nozzle 1510 so that the cross-sectional area of the air path from the air room 103 to the nozzle section 1510 is narrowed gradually, thereby suppressing a rapid change of the fluid resistance.

The bolt joint section 101 is a hole formed in the center of the body section 153 to be passed through the bolt 160. The bolt 160 passes through every bolt joint section 101 arranged in each of discs 110~150, gives an adhesion force between each of discs 110~150. The vent groove 161 is formed in a longitudinal direction of the bolt 160, and the air supplied from the backflow prevention section 170 or the air supply pipe 200 is transferred to the air room 103 via the vent groove 161.

A first air transfer hole 159a is formed in the body section 153 of the first disc 110, and a second air transfer hole 159b is formed in the body section 153 of the first disc 120, Through the first and the second air transfer holes 159a and 159b, the air held between the first and the second discs 110 and 120 can be transferred to another air room 103 formed by another discs 110~150.

As an example, the disc 150 located on the bottom has a large diameter so that the distance from the vent groove 161 to the air nozzle 105 is longer than the others. Thus, in the disc 150, it is advantageous that the air flow through the air transfer holes 195a and 195b should be activated. In order to activate the air flow through the air transfer holes 159a and 159b, it is a kind of way to coincide the first air transfer hole 159a with the second air transfer hole 159b when viewed in the vertical direction.

On the other hand, the disc 110 located on the top has a small diameter so that the distance from the vent groove 161 to the air nozzle 105 is shorter than the others. Thus, in the disc 110, it is advantageous that the air flow through the air transfer holes 195a and 195b should be depressed. In order to depress the air flow through the air transfer holes 159a and 159b, it is a kind of way to arrange the first air transfer hole 159a and the second air transfer hole 159b in zigzag when viewed in the vertical direction. That is, the first and the second air transfer holes 159a and 159b can be arranged not to be overlapped with each other.

In the embodiment shown in FIGS. 6 and 7, the load applied around the bolt joint section 101 is supported by an elastic force of the body section 153. Thus, because the body section 153 can be elastically deformed, there is concern that the air tightness of the air room 103 may be deteriorated. This problem becomes more serious when the size of the air diffuser 100 is larger.

Figure 8:
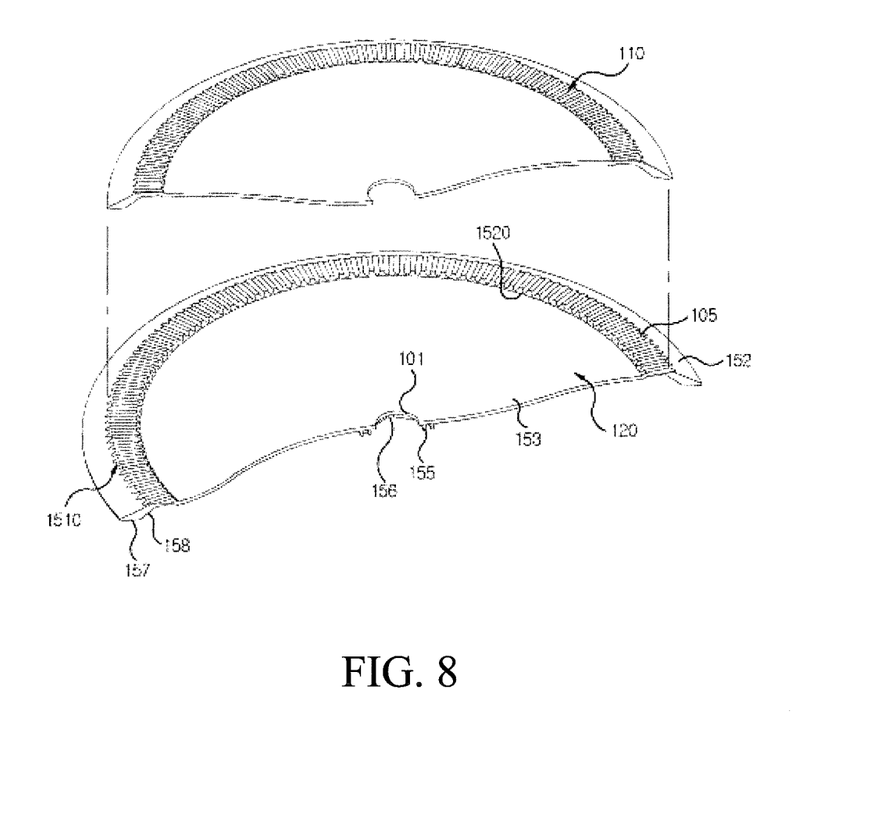
FIG. 8 is a cut-away perspective view showing an example for stacking a first and a second discs according to another embodiment of the present invention.

FIG. 8 shows an embodiment to solve the above problem. As shown in FIG. 8, there is a supporting protrusion 155 protruded around the bolt joint section 101. The load of the center part of discs 110~150 is supported by the supporting protrusion 155. Therefore, it becomes possible to reduce the deformation degree of the body section 153.

It is preferable that a plurality of the supporting protrusions 155 is arranged at an interval along a circumference direction of the bolt joint section 101. An air gap 156 is formed between the supporting protrusions 155 adjacent to each other. The air gap functions as an air path for connecting the air room 103 and the vent groove 161.

As described above, according to the present invention, by exposing a part of the air nozzle 105 formed the upper surface of each of discs 110~150, uniform and minute air bubbles 30 can be supplied over a large area in a great quantity, which makes it possible to increase the contact area between gas and liquid in the aeration tank 20 and the efficiency of mass transfer between gas and liquid.

Further, because it becomes possible to generate uniform air bubbles 30 without increasing their size, the number and the time of running the air blower 40 can be reduced, thereby decreasing considerably the cost of electric energy.

Further, in case that the air pressure is raised by introducing and depositing sludge, the elastic deformation of discs 110~150 is caused intentionally, thereby making it possible to prevent effectively the air nozzle 105 from clogging.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A multi-disc air diffuser comprising:
a bolt having a vent groove formed in a longitudinal direction thereof;
a plurality of discs, each of the discs having a bolt joint section formed at a center thereof through which the bolt passes, an air room for holding the air supplied through the vent groove, and a nozzle section having a plurality of nozzles which are arranged in an end part of the air room at a regular size and intervals, wherein the lower surface of each of the discs is more than the upper surface thereof and the outer circumference surface of each of the discs is formed to be inclined; and
a backflow prevention section for joining to an end part of the bolt to adhere closely the discs to one another, connecting the vent groove to an air supply pipe, and having a check valve which prevents the air flowing backward from the vent groove to the air supply pipe;
wherein each two discs being adjacent to each other are arranged that a lower surface of an upper disc is adhered closely to an upper surface of a lower disc and the air nozzle formed on the upper surface of the lower disc is exposed outside of the outer circumference of the upper disc,
wherein a plurality of supporting protrusions are protruded around the bolt joint section to support a load applied in the center part of the discs.

2. The multi-disc air diffuser according to claim 1, wherein the opening width of the air nozzle is 0.1~0.8 mm.

3. The multi-disc air diffuser according to claim 1, wherein at least one of the discs is made of a flexible material, and when a pressure of the air room is raised, the end part of the disc is deformed elastically by the pressure to prevent the air nozzle from clogging.

4. A multi-disc air diffuser comprising:
a plurality of discs, each of the discs having a body section of a circular plate shape, a nozzle section including a plurality of air nozzles for spraying air which is arranged along outer circumference of the body section and opened in an radial direction of the body section, an outer inclined section extended to be inclined to the outside of the nozzle section, a contact surface corresponding to a lower surface of the outer inclined section, and a bolt joint section formed in the center of the body section, wherein an air room is formed between two body sections adhered to each other; and a bolt for passing through the bolt joint section, capable of adhering closely the plurality of discs to each other;

wherein a lower disc positioned in a relatively lower layer of the plurality of discs is adhered closely to an upper disc positioned in a relatively upper layer, and a part of the air nozzle of the lower disc is exposed to the outside of the outer circumference of the upper disc, while air nozzle of the lower disc is covered with the contact surface of the upper disc, wherein a plurality of supporting protrusions are protruded around the bolt joint section to support a load applied in the center part of the discs.

5. The multi-disc air diffuser according to claim 4, wherein an air supply pipe for flowing air is connected to the bolt; and wherein a vent groove is formed in a longitudinal direction of the bolt and the air supplied from the air supply pipe is transferred to the air room through the vent groove.

6. The multi-disc air diffuser according to claim 4, wherein each of the discs has an air transfer hole, and the air of the air room is transferred to a stacking direction of the discs through the air transfer hole.

7. The multi-disc air diffuser according to claim 4, wherein each of the air transfer hole of the discs is arranged in zigzag so as not to be overlapped with each other.

8. The multi-disc air diffuser according to claim 4, wherein a plurality of supporting protrusions are arranged at an interval along a circumference direction of the bolt joint section; and wherein an air gap is formed between the supporting protrusions adjacent to each other.

9. The multi-disc air diffuser according to claim 4, wherein an inner inclined section is arranged in the inside of the contact surface to narrow gradually the air path from the air room to the nozzle section.

10. The multi-disc air diffuser according to claim 4, wherein at least one disc of the plurality of discs is made of flexible materials so that when the pressure of the air room goes up the end part of the disc can be deformed elastically by the pressure, thereby making it possible to prevent the air nozzle from clogging.

* * * * *